United States Patent [19]
Garson et al.

[11] Patent Number: 5,689,550
[45] Date of Patent: Nov. 18, 1997

[54] INTERFACE ENABLING VOICE MESSAGING SYSTEMS TO INTERACT WITH COMMUNICATIONS NETWORKS

[75] Inventors: Michael Garson, Cleveland, Ohio; Bruce D. Stewart, Sebastian, Fla.

[73] Assignee: Voice-Tel Enterprises, Inc., Cleveland, Ohio

[21] Appl. No.: 287,822

[22] Filed: Aug. 8, 1994

[51] Int. Cl.$^6$ .............................. H04M 1/65; H04J 3/24; H04L 12/66
[52] U.S. Cl. .................. 379/89; 348/15; 370/395; 370/402; 379/32; 379/202; 379/207
[58] Field of Search .................. 379/89, 88, 67, 379/94, 207, 204, 202, 32; 370/61, 85.13, 60.1, 352, 355, 395, 401, 402, 403, 404, 428; 348/15, 14

[56] References Cited

U.S. PATENT DOCUMENTS

| | | | |
|---|---|---|---|
| 4,914,586 | 4/1990 | Swinehart et al. | 379/96 X |
| 5,113,430 | 5/1992 | Richardson, Jr. et al. | 379/88 |
| 5,282,244 | 1/1994 | Fuller et al. | 379/230 |
| 5,289,468 | 2/1994 | Yoshida | 370/85.13 |
| 5,309,437 | 5/1994 | Perlman et al. | 370/85.13 |
| 5,333,266 | 7/1994 | Boaz | 379/94 X |
| 5,341,374 | 8/1994 | Lewen et al. | 370/85.4 |
| 5,351,276 | 9/1994 | Doll, Jr. et al. | 379/67 |
| 5,406,557 | 4/1995 | Baudoin | 370/61 |
| 5,426,637 | 6/1995 | Derby et al. | 370/85.13 |
| 5,440,624 | 8/1995 | Schoof, II | 379/202 |

OTHER PUBLICATIONS

"Interconnecting LANs", R. L. Sharma, *IEEE Spectrum*, Aug. 1991, pp. 32–38.

"B–ISDN and How it Works", D. Delisle and L. Pelamourgues, *IEEE Spectrum*, Aug. 1991, pp. 39–44.

"Inside Routers: A Technology Guide for Network Builders", R. Boule and J. Moy, *Data Communications*, Sep. 21, 1989, pp. 53–56, 59, 60, 65 and 66.

*VoiceMemo Installation and Service Manual for Software Release 5.03B*, Centigram Communications Corp., San Jose, Calif., 2700–0885–11 Rev. A, Dec. 1, 1993.

*Primary Examiner*—Thomas W. Brown
*Attorney, Agent, or Firm*—Townsend and Townsend and Crew LLP

[57] ABSTRACT

Methods and apparatus for interfacing a plurality of voice messaging systems with a communications network are disclosed. Voice messages from voice message computers 450 are processed by an interface 410 and transmitted over communications network 390 to its destination. The interface allows the voice messaging computers to establish connection to the communications network without dialing into it.

25 Claims, 13 Drawing Sheets

INTERFACE ENABLING VOICE MESSAGING SYSTEMS TO INTERACT WITH COMMUNICATIONS NETWORKS

BACKGROUND OF THE INVENTION

The present invention is related to the field of telecommunication. In particular, the present invention provides an interface that enables voice messaging systems to interact with communications networks.

Voice messaging systems (VMSs) are known in the art of telecommunications. Such VMSs have internal mass storage capabilities to assist in the processing of calls. For example, VMSs allow callers to leave messages for a call recipient who is not able to receive a call. The caller's message is stored in the recipient's "mailbox" for retrieval by the recipient at a later time. A mailbox refers to the location in a central memory device assigned to a specific user or recipient. Each user in the system is assigned its own mailbox, which is accessible only by the assigned user. In addition, VMSs route incoming calls to the appropriate extensions and provide intra-office and inter-office messaging services.

Typically, a user interacts with a VMS through Touch-Tone keys of a telephone keypad. By depressing the appropriate keys, the user can control message delivery and retrieval. In some systems, voice prompts may guide the user through the various VMS functions.

In practice, VMSs are linked to private branch exchanges (PBX). This allows VMSs to take advantage of services such as automatic call forwarding on no answer, as well as other functions provided by the PBX. Of particular interest to the present invention is the ability of VMSs to automatically call designated stations and deliver messages stored in the electronic mailboxes.

PBXs are on premises telephone exchange systems capable of both voice and data connections. Typically, a PBX provides a point of interconnection for telephone extensions or systems within the office and a trunk connection to the nearest central office telephone exchange. Calls or transmissions within the office are made through the PBX; calls outside the office are directed by the PBX to the public telephone network.

By interconnecting VMSs at remote locations through the public telephone network, messaging services between mailboxes maintained at each location are provided. In this configuration, access to a remote VMS is achieved via a modem (i.e., dialing, connecting, and transferring the message to the remote VMS). This is cumbersome, time consuming, and not cost effective. It is desirable, therefore, to provide a more efficient method and device for delivering messages to another VMS.

SUMMARY OF THE INVENTION

Improved devices and methods of voice messaging are provided by virtue of the present invention. According to one embodiment, a voice messaging processor which provides voice messages is linked to an interface. The interface receives messages from the voice messaging processor according to a first protocol. The interface processes the message, which includes translating the first protocol to a second protocol. As a result, the message can be transmitted across a communications network to its destination. The interface improves the quality and quantity of messages which are sent over a wide area network. A further understanding of the nature and advantages of the inventions herein may be realized by reference to the remaining portions of the specification and the attached drawings.

TABLE OF CONTENTS

Figure 1:
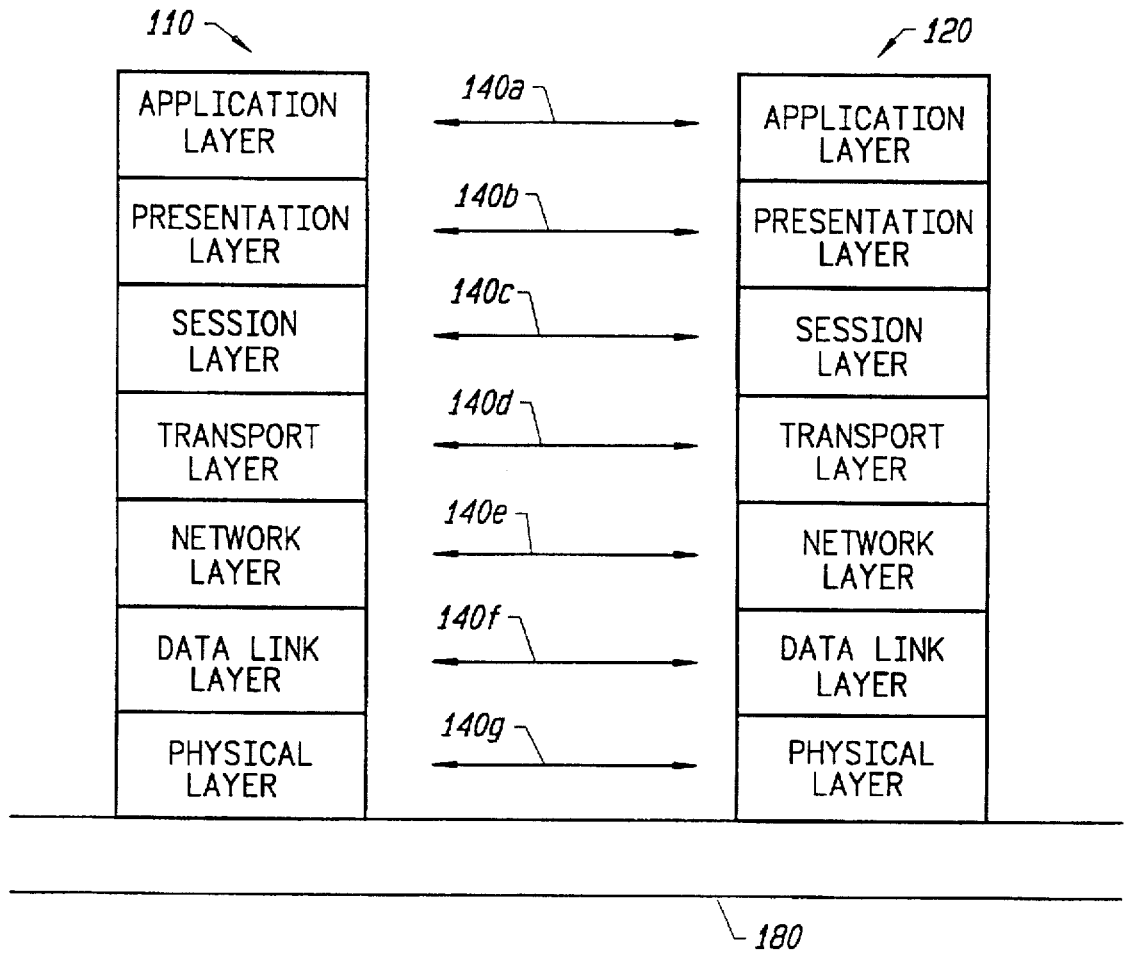
FIG. 1 illustrates the OSI Reference Model.

I. General
II. System Architecture
  a. General
  b. Remote Site Hardware Architecture
  c. Remote Site Software Architecture
  d. Network Management Site
III. System Operations
  a. Message Transfer
  b. Message Translation
  c. Archiving and Deleting Call Files and CDR Records
  d. Updating Network Database

DESCRIPTION OF THE PREFERRED EMBODIMENT

I. General

The present invention provides an improved communications system for sending and receiving voice messages over a communications network. Before describing the invention in greater detail, it is helpful to first describe general networking principles.

The basic concern of networking is the ability of the systems within the network to interoperate with each other. To address this concern, standards have been established to provide some uniformity in the world of communications. These standards establish the protocols which systems use to communicate with each other. The following is a brief description of the communications standards according to the Open Systems Interconnection Reference Model. The model contains seven layers, each layer or protocol defining different functions.

The Physical Layer handles bit-transmission between one node (e.g., host, workstation) and the next. The Physical Layer functions include interfacing with the transmission media; encoding the data signal; defining the range of the voltage or current magnitudes; defining the connector sizes, shapes, and pinouts; and any such function that is generally associated with the physical transmission of the bit stream.

The Data Link Layer maintains a reliable communication link between nodes. As such, it assumes that the Physical Layer is noisy or prone to errors. Data Link provides a reliable delivery mechanism to transmit frame (or package) of data bits to the next node. Data Link Layer inserts addresses into the frame (including source and destination) and provides error control for the data. Error control may be implemented, for example, with a Cyclic Redundancy Check (CRC) or other error detection technique.

The Network Layer establishes a path for the traveling data packet along the communication subnet from the source node to the destination node. The Network Layer switches, routes, and controls the congestion of these information packets within the subnet.

The Transport Layer provides reliable delivery of host messages originating at Layer 7, the application layer, in the same way that the Data Link Layer assures reliable delivery of frames between adjacent nodes. The major difference between the Data Link and Transport Layers is that the Data Link domain lies between adjacent nodes, whereas the Transport Layer's domain extends from the source to the destination (or end-to-end) within the communication subnet. Issues concerning source-to-destination messages are important in the Transport Layer. For example, the Transport Layer segments a long message into smaller units (packets) prior to transmission and assures the reassembly of those packets to form the original message at the receiver's end.

The Session Layer establishes and terminates process-to-process communication sessions between hosts. Translation between name and address databases, as well as synchronization between the two hosts, may be required to manage the sessions.

The Presentation Layer establishes the syntax (or form) in which data are exchanged between the two hosts. As such, the Presentation Layer provides a data manipulation function, not a communication function. Data compression and data encryption are two examples of Presentation Layer services.

The Application Layer provides end-user services, such as Application Layer file transfers, electronic messages, virtual terminal emulation, and remote database access. The end user interacts with the Application. In this manner, the various other layers appear to be transparent to the end user.

The seven layers are divided into two subsets. The first is comprised of the lower three layers (the Physical, Data Link, and Network layers). These layers are sometimes referred to as the "communications subnetwork", subnet, or the carrier portion of the system. The upper three layers (Session, Presentation, and Application layers) are collectively known as the host process or customer porion of the system. The middle layer (Transport) is the first end-to-end layer and acts as a buffer between the two subsets. Generally, the Transport Layer is often grouped with the upper layer as part of the host process.

FIG. 1 illustrates a simple local area network (LAN) comprising two systems. As depicted, system 110 is linked to system 120 by a physical medium 180 (i.e., cable) to form the LAN. The systems communicate or interact with each other through a set or suite of protocols. Consistent with the OSI model, each layer will have its own protocol. Typically, the protocols function on a peer-to-peer basis between each of the layers as indicated by the logical (or virtual) communication paths 140a–g. The interface between the layers within the same system is a vertical relation, whereas the protocol is a horizontal relationship between peer layers of the adjacent system. Communication between two systems is effected in the following manner. A user inputs data such as electronic mail message in the Application Layer of system 110 (host) for transmission to the Application Layer of system 120 (destination). The message proceeds down through the seven layers (from the Application Layer to the Physical Layer) of system 110, across cable 180, and up the seven layers (Physical Layer to the Application Layer) of system 120.

Figure 2:
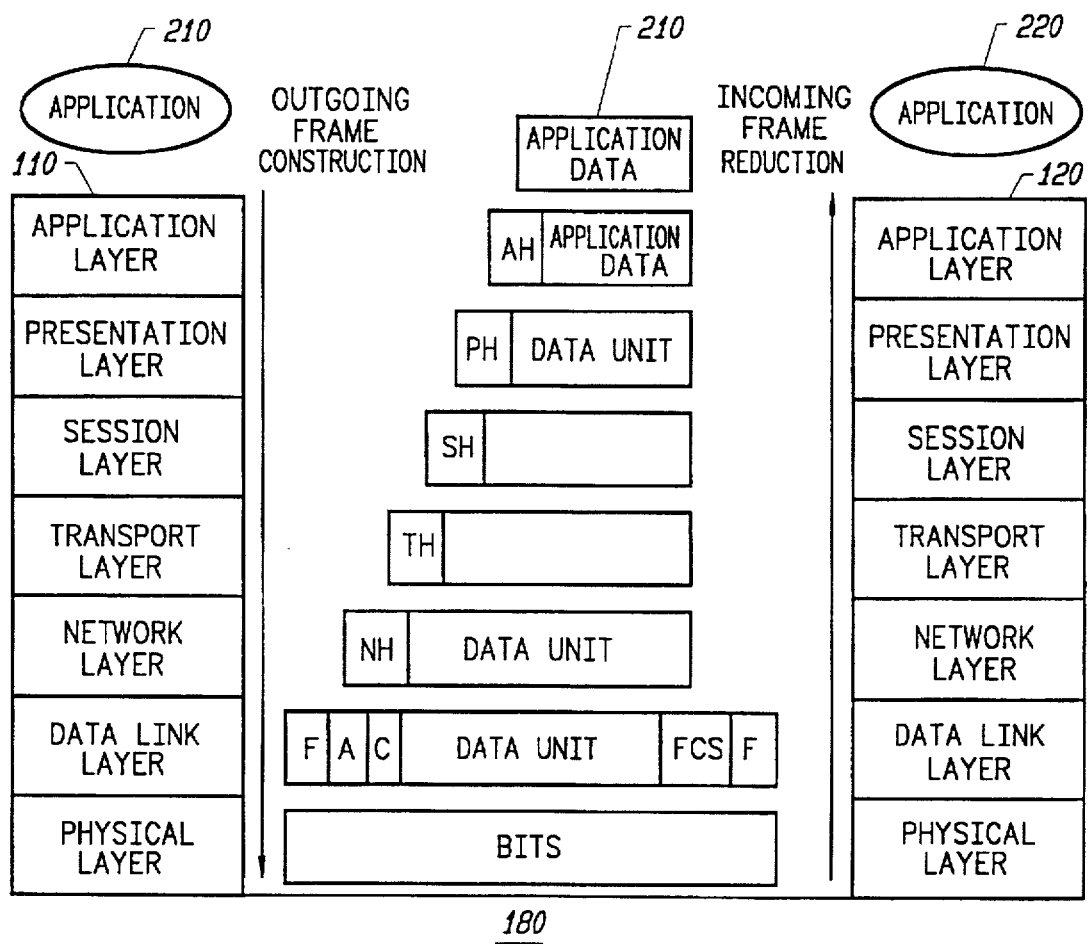
FIG. 2 illustrates data transfer in the OSI Reference Model.

FIG. 2 illustrates in detail the process in which data are transported from host system 110 to destination system 120 through a physical medium 180. Data from an Application Process 210 in system 110 is passed to the application layer protocol. The Application Layer appends its Application Header (AH) to the application data. The AH contains protocol control information necessary for a peer Application Process 220 to interpret the data. The data unit is then passed to the Presentation Layer. The Presentation Layer treats the data unit as its own data, appends the Presentation Header (PH) and passes the data unit down to the Session, Transport, and Network Layers in turn. With each successive transfer, the data is encapsulated with the respective layer's header (i.e., SH, TH, and NH).

The same process occurs when the encapsulated data reaches the Data Link Layer. The Data Link Header generally comprises Framing (F), Address (A), and Control (C) information. In addition, the Frame Check Sequence (FCS) and/or additional Framing (F) characters are added as the Data Link Layer trailer. The assembled frame is then passed to the Physical Layer wherein the data are encoded for transmission. Next, the Physical Layer accesses the transmission medium and monitors the serial bit transmission. At the destination node, the reverse of this process occurs. The Physical Layer hands its bits to the Data Link Layer, which decodes and then strips off the Data Link Layer header and trailer. The Data Link Layer data unit is then passed to the Network, Transport, Session, and higher layers in turn. This process is completed when the original data is presented to the Application Process 220.

In practice, numerous LANs are linked together to form, for example, an "internet." Each LAN or subnetwork is linked to a backbone network capable of high bandwidth. The backbone network is sometimes referred to as wide area network (WAN). Generally, the individual LANs are interconnected to the WAN by a switching router, switching hub, or the like. Such interconnecting device is commonly referred to in the art as a "router". The router operates at the "communication subnet" and logically separates the subnetworks. Routing tables, which inform the router of the WAN topology, provide the information needed to route the data to its destination. In large networks, the data may travel through many intermediate nodes before reaching its destination. Various methods for transmitting data over communications networks, such as packet switching, are known. In packet switching, data are transmitted in blocks called packets. The upper bound limit on the length of the packets, for example, may be about 1000 octets (bytes). If a message exceeds the limits, it is broken into a series of packets. Each packet consists of a portion of the data that a system wants to transmit and a packet header that contains controls information necessary for the network to route the packet to their intended destination. In large networks, the packet may be routed through a plurality of nodes before it reaches its destination. At each node en route, the packet is received, stored briefly, and passed on to the next node. Eventually, all the packets that comprise the message will be delivered to its intended destination. There are two approaches, datagram and virtual circuit, which are implemented by networks to handle the stream of packets as it is routed to its destination.

In the datagram approach, each packet, which is referred to as a datagram, is treated independently, with no reference to packets that have previously been sent. Each intermediate node chooses the datagram's next path, taking into account information received from adjacent nodes such as traffic, line failures, and others. As a result, each datagram may travel different paths even though they contain the same destination address. Additionally, the datagrams may arrive at the destination out of sequence, or some may even be lost during transit. In some networks, the destination node is responsible for reordering the datagrams and informing the source node to resend the lost data. The datagram approach is referred to as a "connectionless-mode" transmission. In other words, units of data are transmitted from the source to the destination without establishing a route or connecting to it.

On the other hand, the virtual circuit approach establishes a preplanned route before any packets are sent. This route serves to support a logical connection between the source and destination node. Once the route is established, all of the packets are sent using the same route. In this manner, the packets arrive at the destination in the correct sequence. This approach is referred to as a "connection-mode" transmission, which means that a route between the source and destination is established prior to the transmission. A more detailed discussion on networking principles may be found in Miller, *Internetworking, A Guide to Network Communications*, 1991, incorporated herein by reference for all purposes.

II. System Architecture
a. General

Figure 3:
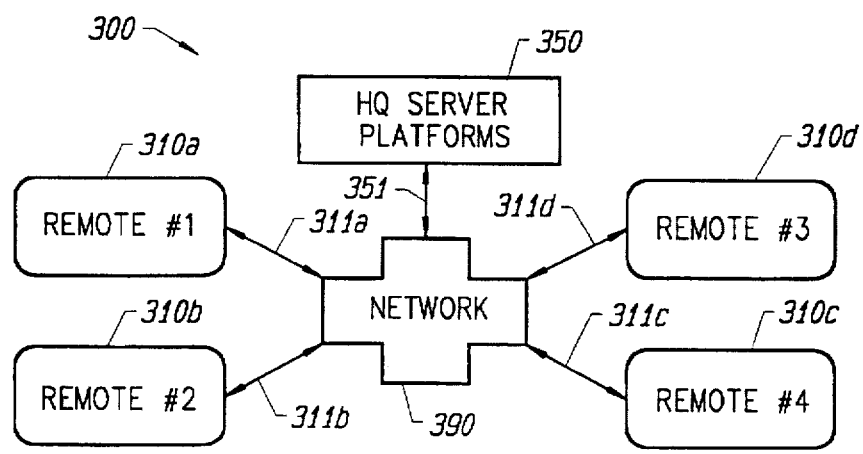
FIG. 3 illustrates the topology of the communications network according to the present invention.

FIG. 3 depicts the general architecture of the communication system 300 disclosed herein. As shown, a plurality of remote sites 310a–310d, each having voice messaging capabilities, are attached to a communications network 390 by links 311a–311d respectively. Each remote site is assigned a unique network address or node id. The network address associated with each voice message determines which remote site receives the message. A network management site 350, which also is assigned a unique network address, is connected to network 390 by link 351. The network management site monitors and manages the network. In this manner, subscribers of one remote site can send voice messages to one or more subscriber(s) located on the other remote sites.

b. Remote Site Hardware Architecture

Figure 4:
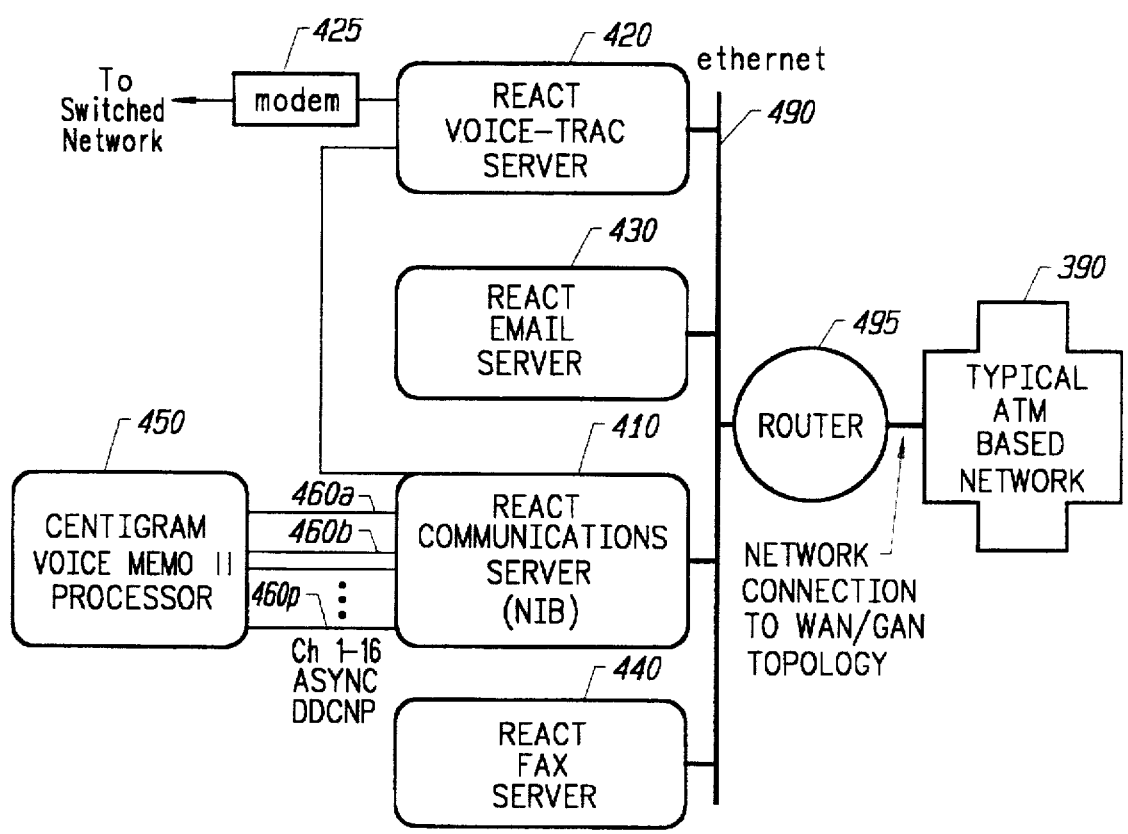
FIG. 4 illustrates hardware architecture of the Network Interface Box (NIB) according to the present invention.

FIG. 4 illustrates a remote site in detail. The remote site comprises a LAN 490 interconnected to communications network 390 by a router 495. Communications network 390 may, for example, be a wide area network WAN of the type that is well known in the art such as Asynchronous Transmission Mode (ATM), frame relay, or other network. In one embodiment, data are transmitted through the WAN using the Transmission Control Protocol/Internet Protocol (TCP/IP) suite. The TCP/IP suite, for example, may be encompassed by the entire protocol suite of ATM technology. This includes ATM, frame relay, ISDN, Broadband ISDN, SMDS and other network. A description of TCP/IP can be found in Michell and Quarterman, *Practical Internetworking with TCP/IP and UNIX*, Addison-Wesley Publishing, Jan. 19, 1993, incorporated herein by reference for all purposes.

LAN 490, for example, may be an Ethernet. Alternatively, token ring, FDDI, or other LAN may be used. Router 495, for example, may be a digital computer of the type that is well known to those skilled in the art such as a RISC Networking Processor. In one embodiment, the router networks TCP/IP data and determines the network traffic flow. Generally, the path selection is made from several paths based on 1) information obtained from specific protocols, 2) algorithms that attempt to identify the shortest or best path, and 3) other criteria such as metrics or protocol-specific destination addresses. A discussion on routers can be found in Miller, *Internetworking, A Guide to Network Communications*, M&T Books, Feb. 19, 1991, incorporated herein by reference for all purposes.

The LAN includes a communications server 410 which interfaces a VMS 450 with the WAN. Communication Server 410 is referred to elsewhere herein as the "Network Interface Box" or "NIB™". The NIB includes a digital computer of the type readily known to those skilled in the art. In some embodiments, the computer is based on current INTEL 486 technology, although it will be apparent to those skilled in the art that a wide variety of digital computers, such as IBM AIX and RES6000, INTEL Pentium, and DEC ALPHA, can be utilized without departing from the spirit of the invention herein. According to one embodiment, the INTEL 486 computer may be installed with Santa Cruz Operation (SCO) UNIX Operating System, SCO TCP/IP Runtime System (includes SNMP agent), and/or C++ language using RDBMS and Object Oriented Protocols which are managed by RAIMA and SCO FoxPRO Data Base Management Systems to facilitate communication between the VMS and the WAN. Santa Cruz Operations is a corporation located in Santa Cruz, Calif. Information regarding SCO UNIX and SCO TCP/IP Runtime system can be found in the SCO Manual Set available from SCO, part number BJ01205P001, published by P-H on Apr. 19, 1993. This set includes *SCO UNIX Operating System: System Administrators Guide*, part number AU01211P001; *SCO UNIX Operating System: User's Guide*, part number AU01210P001; *SCO TCP/IP Runtime System for SCO UNIX Systems: Command Reference;* part number AU02802P001; *SCO TCP/IP User's Guide*, part number AU02802G002; *SCO TCP/IP Runtime System for SCO UNIX Systems: User's and Administrator's Guide*, part number AU02801P001; and *SCO UNIX Operating System: System Administrator's Reference*, part number AU01213P001, all incorporated by reference for all purposes.

In one embodiment, VMS 450, is a Centigram Voicememo II manufactured by Centigram Inc. of San Jose, Calif., although it will be apparent to those skilled in the art that VMSs manufactured by other vendors such as Octel Voice mail or NTI (Northern Telecom, Inc.) Meridian voice mail may be employed. The communication protocol employed by the Centigram Voicememo II is a variant of the Digital Data Communication Message Protocol (DDCMP) developed by Digital Equipment Corporation. The operations of Voicememo II are described in *Centigram Operations Manuals* provided by Centigram Inc. of San Jose, Calif., while DDCMP is described in detail in Tanenbaum, *Computer Networks, Prentice Hall Publishing*, 2nd Edition, 1988, all incorporated herein by reference for all purposes.

The NIB communicates with VMS 450 through, for example, an asynchronous link. In some embodiments, the NIB provides up to 16 asynchronous links 460a–460p for communicating with the VMS.

Optionally, the remote site includes other devices such as a voice-trak server 420, electronic mail (email) server 430, and fax server 440. The various devices are interconnected via LAN 490.

The email server may, for example, be of the type that is well known to those skilled in the art, such as Lotus Notes. Discussion on Lotus Notes may be found in Pyle, *Creating Lotus Notes Application*, Que Publishing, Jan. 19, 1994, incorporated herein by reference for all purposes. The email server connects, through the network, to all compatible email services such as MCI Mail. The fax server, which also is well known in the art, connects via the network to all group 3 or group 4 compatible faxes. A discussion of group 3 and group 4 faxes can be found in Griffiths, *ISDN Explained*, John Wiley & Sons, 1990, incorporated herein by reference for all purposes. The email and fax servers enable users to forward email and fax transmissions, similar to voice messages, throughout the network.

The voice trak server may be a computer that is well known to those skilled in art such as a computer based on current INTEL 486 technology. In one embodiment, the voice trak server is installed with VOCAM™ software from Voice-Tel Enterprises. Through VOCAM™, the voice trak server performs administrative and accounts receivable functions, such as generating reports, network traffic statistics, and other functions.

In some embodiments, a modem 425 may be provided to establish links to other public or private switched networks. The modem, which may be a V.32 bis type or other that is well known to those skilled in the art, is connected to the voice track server's COM 1 or other asynchronous port. The modem may also provide an alternative way for accessing the WAN. Thus, data can be sent/received to/from NIBs not linked to the WAN.

c. Remote Site Software Architecture

Figure 5:
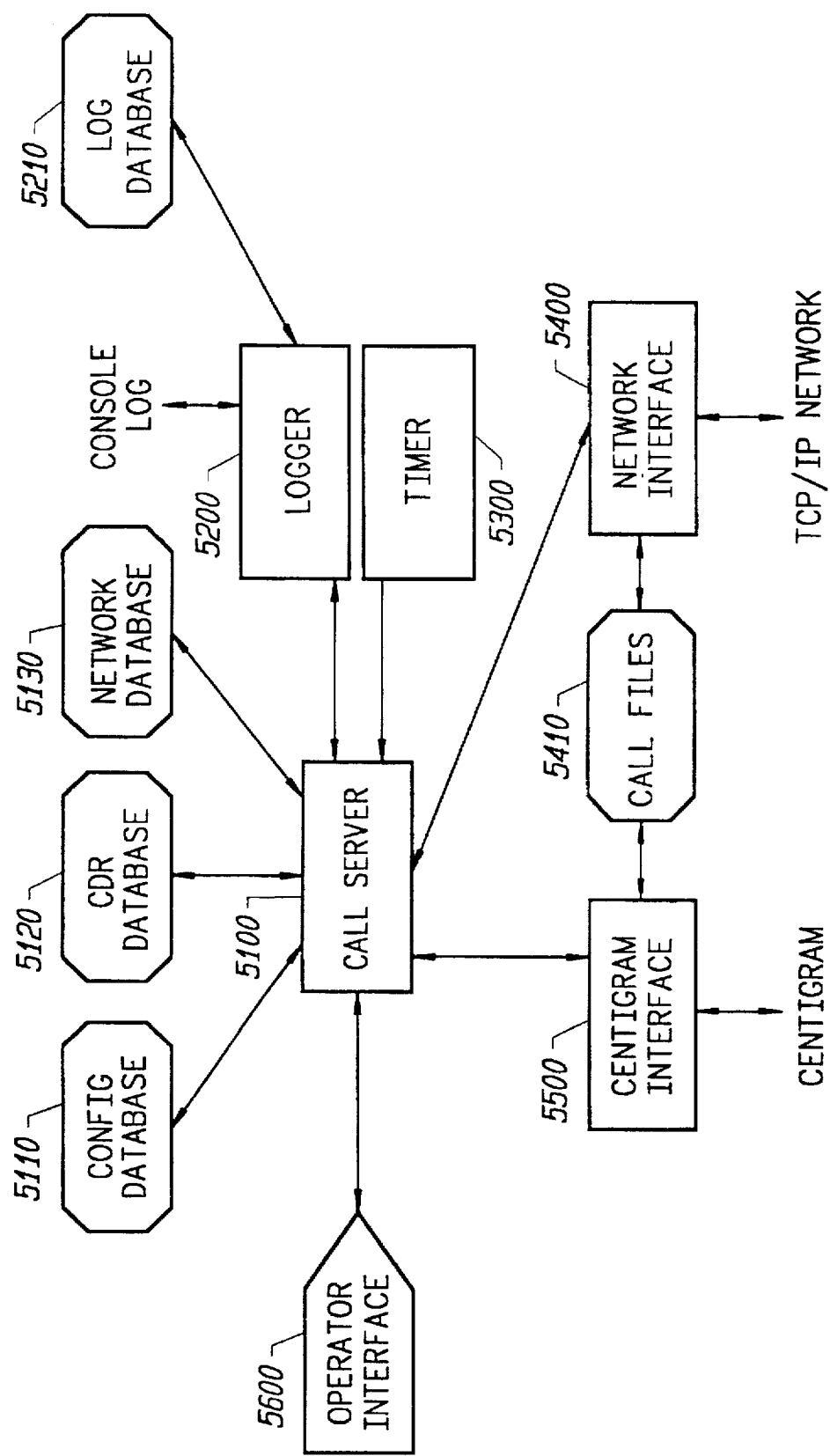
FIG. 5 illustrates the software architecture of the NIB of FIG. 4.

FIG. 5 shows the architecture of the NIB software. A call server module 5100 controls the overall operations of the NIB. Call server 5100 interfaces with Config 5110, CDR 5120, and Network 5130 databases, which serve as information servers. A VMS Interface module 5500 and a Network Interface module 5400 facilitate data transfers between the VMS and the WAN. A Call Files database 5410, which stores the voice messages, is linked to both voice VMS and WAN interfaces. A Timer module 5300 serves to inform the Call Server when a predefined time interval has expired. A Logger module 5200 accepts preformatted log messages from the Call Server and stores them in a Log database 5210. In some embodiment, the Logger also displays the log messages on the Log console. An Operator Interface 5600 provides an interactive interface between the NIB and a user to, for example, examine the status of the NIB or issue NIB commands.

The databases are written as Raima DDL files. Accordingly, the name of the databases will be in form name.ddl. The functions and contents of the various databases will now be described in detail.

Config database (cfg.ddl) 5110 contains information that defines the operating parameters of the NIB. In some embodiments, the information may be contained in one file. The operating parameters, for example, include: the voice messaging processors node name, NIB network address, current version of the NIB software, the name of the various databases (CDR, Network, and Log), address of the Network Manager, number of TCP senders, number of TCP receivers, number and configuration details of the voice messaging ports, and current values of the various operating parameters.

Call Files database 5410 contains the actual voice message from the voice messaging processor. When the voice messaging processor executes a call, it is stored in a separate call file which comprises the application layer header information and compressed voice data for the call. Each call file is assigned a unique filename by the origin NIB. In one embodiment, the filename format comprises the voice messaging processor node id (4 octets) followed by a 6 octet sequence of numbers. The filename also serves as the "callid" used as the key in the CDR database to store details about the call.

The CDR database (cdr.ddl) contains detailed information for each voice call. It also contains an associated delivery record for each destination mailbox for which the call is destined. The call record and mailbox records collectively may include the following information:

a) callid, which corresponds to its call file name;
b) message status code;
c) message type (voice or greeting);
d) origin Node ID;
e) origin mailbox number;
f) date and time message was originated;
g) destination node;
h) message number;
i) message Type;
j) message handling instructions (i.e., priority, receipt requested);
k) length of message plus any attachments (frame count);
l) number of attachments to the original message (message count);
m) number of recipients on the node the message is being sent to (distribution count);
n) separate database records for each destination mailbox;
o) mailbox number of each recipient;
p) date, time, and status of delivery to each destination mailbox; and
q) retry counter for use by the call server in error recovery.

The Network database (net.ddl) contains one record for each voice message processor node in the network. The record defines the network address associated with the node on the communications network. The database also contains a record for each NIB in the network, which associates the NIB with its network address. For the NIB(s) containing the network manager, the database also contains the queue of network database updates that are being distributed by network manager. Once all NIB updates have been completed, this queue will be empty.

The Log database (log.ddl) contains one record for each loggable event that has occurred on the NIB. In some embodiments, a loggable event is defined by the header file. A loggable event, may, for example, be the delivery of one call or VMS message. The record contains an event code, the date and time the event occurred, and a text message describing the event. For consistency with the database maintained by the network manager, each record also includes the node id of the NIB.

The software architecture also includes definition files which are used by the various software modules. Such definition files are referred to as "header files." According to one embodiment, the NIB includes server.h, ascii.h, strans.h, events.h, and centigram.h header files.

Server.h defines general purpose constants and macros used by all the NIB's software modules and ascii.h defines ASCII constants which are well known in the art. The strans.h header file defines transactions that are used between software tasks on the NIB. Generally, each transaction is associated with its own parameters. Communication between software tasks are effected through UNIX interprocess queues. The format and contents of a block of data passing through these queues are governed by strans.h. In addition, strans.h defines the values for various status bytes.

The event.h header file defines reportable events, including event type, reporting level (not logged, logged locally, reported to network manager), and contents/format of the test message accompanying the event report. The centigram.h header file defines the data structures and header format for the VMS DDCMP and messaging protocols, which can be found in *Voice Memo Design Reference Manual, Configuration Manual,* and *Installation & Service Manual,* which are provided by Voice Tel Enterprises and are incorporated herein by reference for all purposes. The NIB software also includes util.c and log.c utility files. These files provide general purpose functions for the various software modules.

The various software modules will now be described in detail. According to one embodiment, the software modules are written in C, using SCO UNIX C development system. The name of the source file for each software module will be in the form name.c.

The Call Server (server.c) controls the operation of the NIB. At system start up, the Call Server loads configuration data from the Config database. The data represent operating parameters of the NIB. The Call Server creates interprocess queues for tasks that are to be performed by other software modules (i.e., Logger, Timer, and Operator, VMS, and Network Interfaces). These tasks, for example, comprise: call routing, including address translation from VMS protocol to WAN protocol; managing end-to-end call queuing; transferring calls across the WAN; managing and updating the Call Detail Recording database, Log database, system status and error logs; and reporting system status to the requesting operator or network manager tasks. Such tasks are initialized and terminated by the Call Server.

The VMS Interface manages data transfers between the NIB and the VMS via the asynchronous ports (up to 8). In some embodiments, the VMS Interface may comprise two subtasks or procedures, centrx.c and centtx.c. Centrx manages the receive side of the VMS port on the NIB. Centrx accepts complete messages from the VMS and forwards them to centtx for processing, which includes issuing appropriate responses back to the VMS. Centtx performs data transfers and communications to the VMS, including protocol responses at all levels of the VMS protocol. Additionally, centtx interacts with the Call Server and the Call Files database for reading/writing voice call files. In one embodiment, one centrx/centtx pair regulates data transfers in each VMS asynchronous port.

The Network Interface oversees the communication between the NIB and the WAN. According to a specific embodiment, the Network Interface comprises subtasks netsend.c, netrecv.c, callsend.c, callrecv.c, and archsend.c. Each subtask performs a specific portion of the communication over the WAN. Netsend sends UDP datagrams over the WAN network to another NIB. Netrecv receives UDP datagrams from another NIB and queues them to the server. Callsend sends a call file over the WAN network to another NIB, for example using a TCP connection. This includes establishing the TCP connection, reading the file off the disk, and sending it. Callrecv receives a call file over the WAN network from another NIB. This includes accepting the TCP connection, accepting the call data, and storing it on disk. Archsend sends CDR records to the network manager for archiving.

The Logger (tcclog.c) accepts preformatted log messages and displays them on the console along with a date and time stamp. The Timer (timer.c) notifies the call server when a predefined timer interval has expired. The timer interval is defined in the record contained in the Config database.

In some embodiments, the NIB software architecture may include an Interactive NIB Configurator (nibsetup.c). The nibsetup is separate from the other software modules and is used during initialization of the NIB. Nibsetup provides an interactive menu driven interface for a user to configure and view the Network (net.ddl) and Config (cfg.ddl) databases. Also, the nibsetup initializes the Call Detail (cdr.ddl) and the local Log (log.ddl) databases. A more detailed description of the NIB's software architecture can be found in TCC/Voice-Tel Network Interface Box (NIB) Software Specification, Mar. 8, 1994, Software Version: 4.1, incorporated herein by reference for all purposes.

d. Network Management Site(s)

Figure 6:
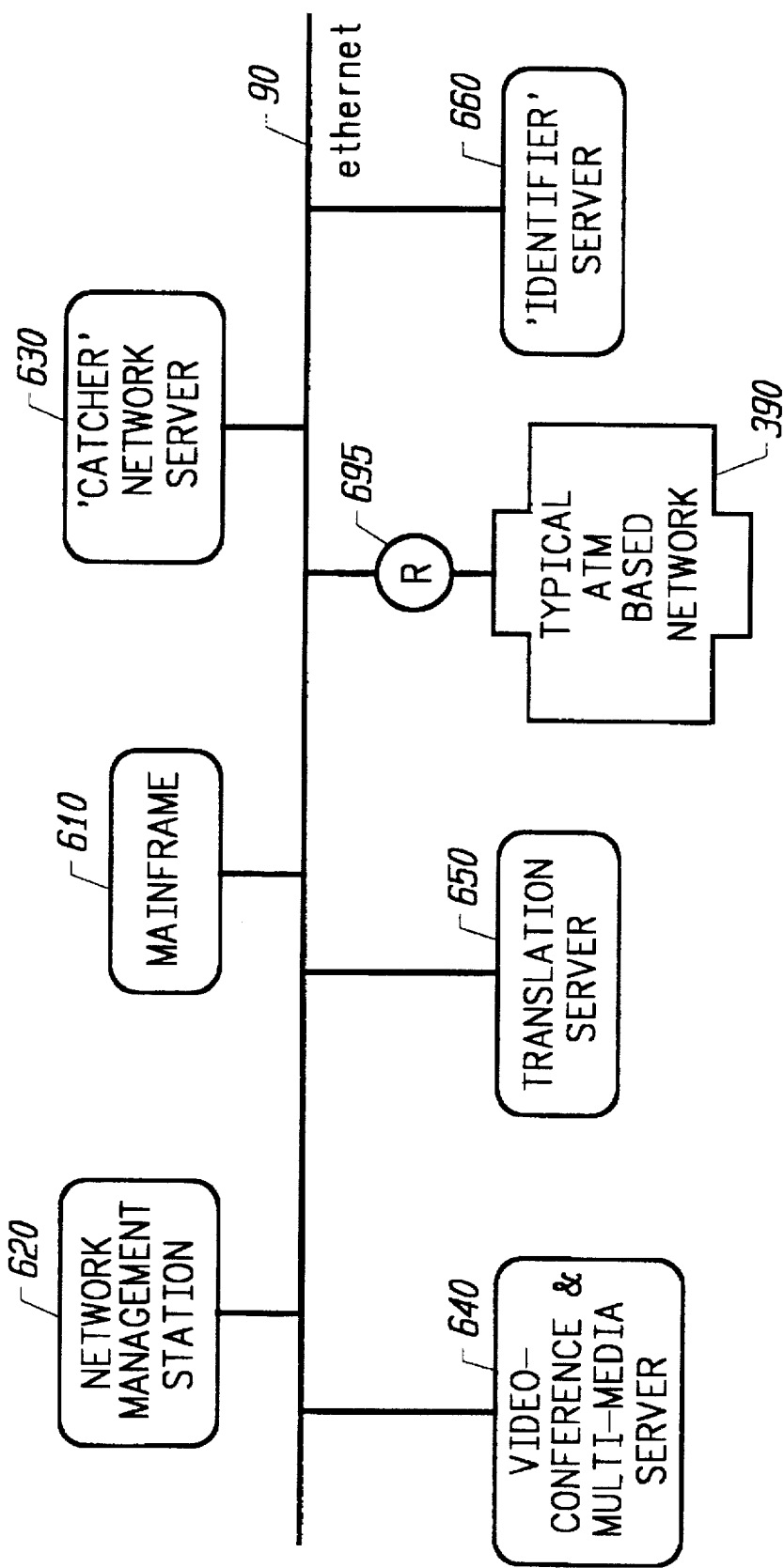
FIG. 6 illustrates the hardware architecture of the network management site.

FIG. 6 illustrates the network management site in detail. The administrator site includes a LAN 690 linked to the WAN 390 by a router 695. The LAN, for example, comprises a network management station 620, a mainframe 610, a catcher network server 630, an identifier server 660, a translation server 650, and video-conference and multimedia server 640.

The LAN, in some embodiments, may be an Ethernet, although other networks may be employed. Communication between the LAN and WAN 390 is effected through a router 695. The router, for example, may be an ACC Nile p/n 8600390.

Catcher Network server 630 may be a digital computer based on current INTEL 486 technology. In some embodiments, the computer functions on a Santa Cruz Operation's UNIX operating system and/or C++ language using RDBMS and Object Oriented Protocols. The Catcher Network server receives the call detail report (CDR) records which are sent from the NIB remote sites. The Catcher Network server then stores the CDR records in the Network Archive database.

Mainframe 610 may be Proliant 4000 manufactured by Compacq Computer Corp. In one embodiment, the mainframe is equipped with VOCAM™ software from Voice-Tel enterprises. The mainframe accesses the CDR records in the Archive database for generating billing reports, error reports, statistical analysis to NIB customers, and other information service (IS) functions.

Identifier server 660 may, for example, be an programmable computer with an Intel Pentium processor. In some embodiments, the Identifier server may be equipped with Hewlett-Packard Openview. All undeliverable voice messages are routed to the Identifier server by the sending NIB. The Identifier server examines the TCP/IP header to assesses the reason for the transmission failure. The Identifier server then transmits an error message, which identifies the problem, back to the appropriate send, receive, and any intermediate NIBs. The NIB, upon receiving the message, informs the VMS, from which the voice message was sent, of the malfunction. In some instances, the message may not have originated from an NIB remote site. If this is the case, the Identifier server will notify the server at which the message originated. The Identifier server also updates the appropriate CDR databases with the transmission failure and reports the malfunction to Network Management System 620.

Network Management System (NMS) 620 may be a computer based on current INTEL 486 technology. According to some embodiments, the NMS is installed with Hewlett Packard Openview. The NMS provides remote network management capability, using, for example, an application protocol such as Simple Network Management Protocol (SNMP). A detailed discussion of SNMP can be found in Miller, *Managing Internetworks with SNMP*, M&T Books, Jul. 19, 1993, incorporated herein by reference for all purposes. In some embodiments, the NMS is provided with an interactive operator interface for performing management functions such as: monitoring alarms from all remote NIBs, reviewing alarm history from all remote NIBs, selecting a specific NIB to monitor, reviewing the configuration of a specific NIB, reviewing call detail status from a selected NIB, reviewing the Network database of a selected NIB, reviewing the alarm history of a selected NIB, interactively updating the Master Network database (located on the NMS) and automatically distributing the updates to all defined NIBs, and delivering a complete copy of the Master Network database to any NIB on the WAN. In some embodiments, the date and time stamp are synchronized by the NMS. Communication between the NIBs and Network management station is through User Data Protocol (UDP) datagrams.

Translation Server 650, which may be a computer having a 64 bit address architecture such as ALPHA manufactured by Digital Equipment Corporation, is provided to translate a message from one medium to another, such as from voice-to-text or text-to-voice. The translation server enables the caller to convert a message created in one medium to another, for example, fax-to-voice, fax-to-email, one type of fax to anther type of fax, email-to-fax, email-to-voice, one type of email service to another type of email service, voice to fax, voice to email, one voice format to another voice format. The translation server may be configured in various manners. For example, each remote site may be equipped with its own translation server or a central translation facility may be provided to serve the network.

Video Conference & Multi-Media server (VCMM) are well known in the art such as those manufactured by Compression Labs, Inc. The VCMM provides video conferencing and multi-media capabilities to subscribers.

III. System Operations
a. Message Transfer

Figure 7:
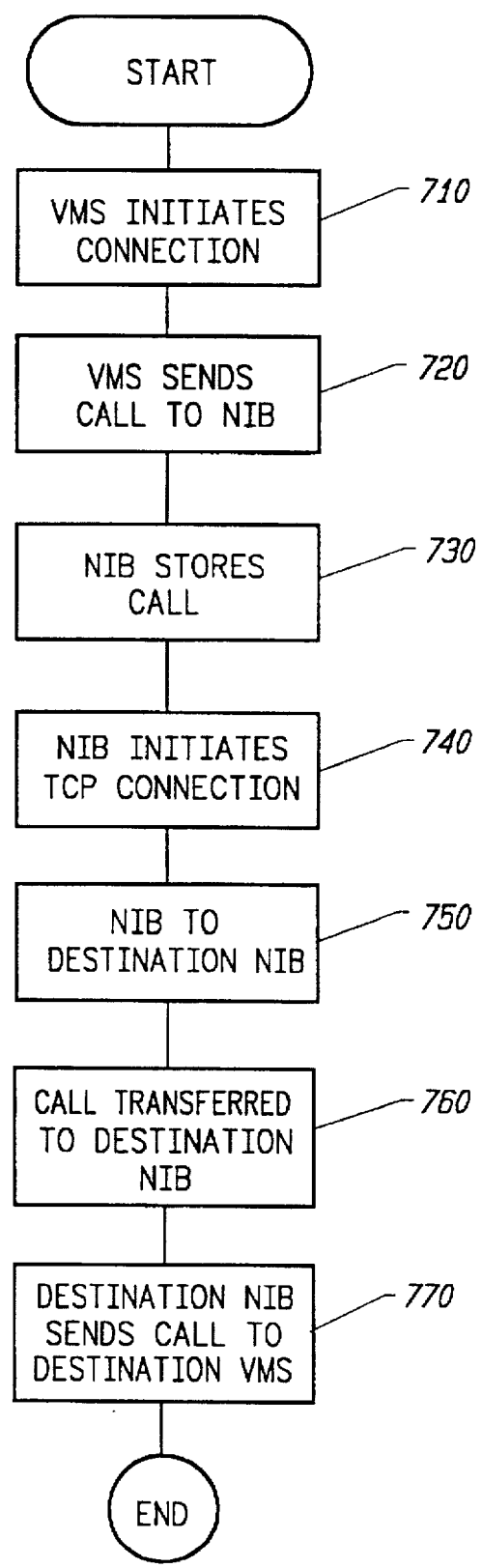
FIG. 7 is a flow chart illustrating the procedure for effecting a message exchange from an originating VMS to the destination VMS.

FIG. 7 illustrates an overview of the process for transferring a call from one originating VMS (oVMS) to a destination VMS (dVMS). At step 710, oVMs presents a call presented to the NIB. Each call represents one voice message between the oVMS node and a single dVMS node. If, however, a caller desires to send the same call to multiple destination nodes, it is presented to the origin NIB for delivery as multiple calls. At step 720, the call is transferred onto the oNIB from the oVMS by the VMS Interface. At step 730, the oNIB stores the call in the Call Files database as a separate call file.

At step 740, after the complete file is stored on the oNIB, the Call Server initiates a TCP connection to the destination dNIB. At step 750, the call file is transferred over the TCP connection. Once the transfer is complete, the TCP connection is released at step 760. At step 770, the Call Server on the dNIB passes the call to the dVMS via the VMS Interface tasks.

As call delivery progresses, the status of the call is reported to the oNIB using separate UDP transactions to indicate delivery events as they occur. These events include: call accepted by dVMS and results of call distribution to destination mailboxes (using a VMS distribution list transaction).

Figure 8A:
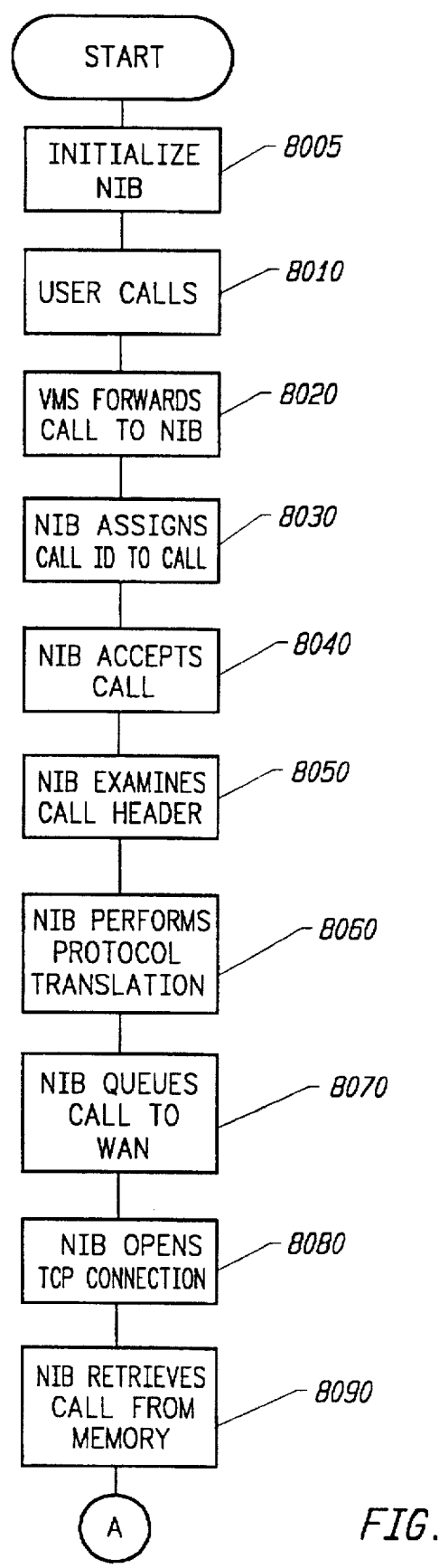
FIGS. 8a–8b are flow charts illustrating the procedure for effecting a message exchange from an originating VMS to the destination VMS in greater detail.
Figure 8B:
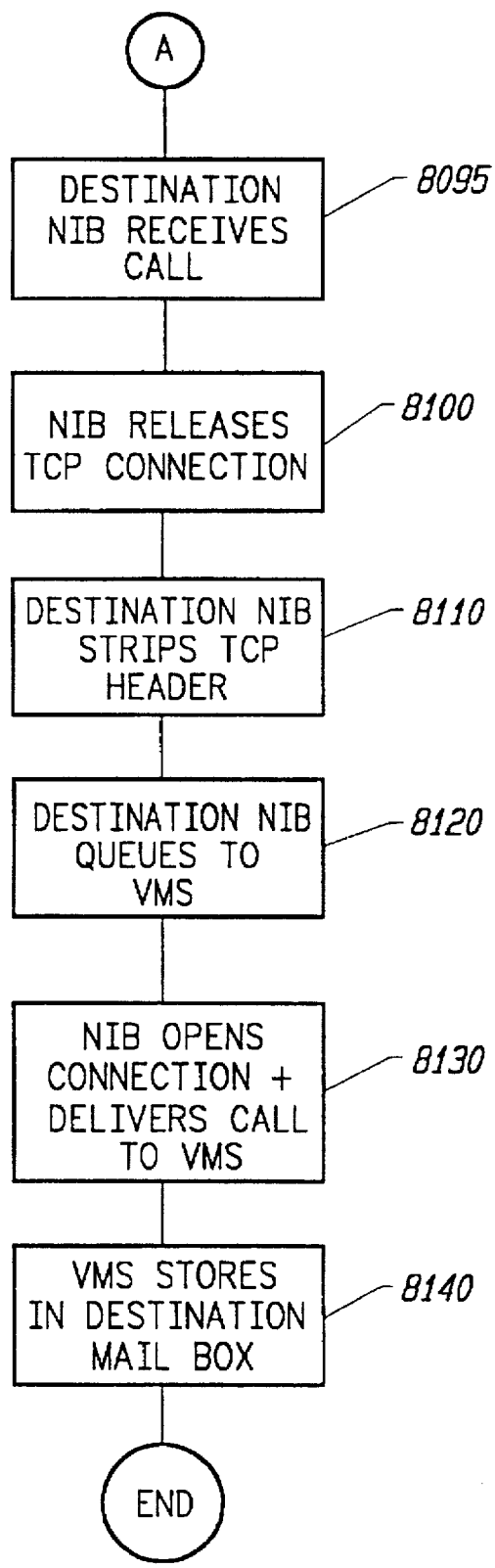

FIGS. 8a–8b illustrates message transfer in greater detail. At step 8005, the NIB is initialized according to the TCC/ Voice-Tel Network Interface Box (NIB) User Manual, Mar. 8, 1994, Software Version: 4.1, incorporated herein by reference for all purposes. At step 8010, a user accesses the VMS by calling his assigned mailbox. Once accessed, the user instructs the VMS to deliver a voice call to a destination mailbox. The oVMS ascertains whether the destination mailbox resides in the local or a remote VMS node. If the destination mailbox is local, the call is forwarded to the mailbox without need for further processing. On the other hand, if the mailbox resides in a remote site, the oVMS forwards the call to the NIB for processing at step 8020. In some embodiments, the call is transmitted to the oNIB using the DDCMP protocol.

The DDCMP protocol provides a header which contains various information such as synchronization signal, size of data, the originating mailbox, originating VMS node ID, destination mailbox, destination VMS node ID, detection of error, and others. A detailed discussion of the DDCMP protocol standard is provided in James Martin, Joe Leben, *DECnet Phase V, An OSI Implementation*, Digital Press, 1992, incorporated herein by reference for all purposes. The NIB's VMS interface receives the call from the VMS.

According to one embodiment, the NIB accepts all VMS messages, regardless of destination. This feature allows the VMS to quickly deliver all traffic to the NIB for further processing. At step 8030, the VMS Interface informs the Call Server of an incoming call from the VMS. This initiates the Call Server to assign a unique filename or callid to the call. The callid, for example, may consist of a 4 byte VMS node id followed by a 6 byte sequence number.

At step 8040, the oNIB accepts the call from the oVMS. The incoming call, depending on its length, may comprise more than one frame. Each frame will include a DDCMP header which identifies the number of total frames in the call, frame sequence number, originating mailbox, destination mailbox, distribution list, and other information. Once the NIB receives all the frames, the call is stored as a call file in the Call Files database. The Call Server also accesses the Config database to identify the CDR database. Once identified, the Call Server creates a CDR file in the CDR database. Both the call file and cdr file are identified by the callid. In some embodiments, the Call Server may instruct the Logger to 1) display the transaction on the console log, and 2) store the event in the Log database.

At step 8050, the Call Server examines the call's DDCMP header, as defined in centigram.h, to obtain detailed information pertaining to the call. The information, for example, includes destination mailbox, originating mailbox, and others as defined by *Voice Memo Design Reference Manual*, already incorporated by reference. The Call Server records the information in the CDR record.

At step 8060, the Call Server reformats each frame for transmission across the WAN. This procedure includes accessing the Network Database to obtain information for translating the destination VMS (dVMS) node name to the appropriate IP address. Also, routing information such as TCP port assignment is provided. The information enables the Call Server to create a TCP/IP header containing the appropriate destination, sequencing, routing, and other TCP/IP information. Thereafter, the DDCMP frame is encapsulated with the TCP/IP header. After the frames have been reformatted, they are stored in the Call Files Database.

At step 8070, the Call Server queues the call to the Network Interface, which sends it across the WAN to its destination. According to one embodiment, the callsend procedure of the Network Interface performs this function.

At 8080, Network Interface establishes a TCP connection with the destination NIB (dNIB). At step 8090, Network Interface retrieves the call from the Call Files Database and sends the TCP/IP packet across the WAN.

According to one embodiment, the frames are first sent to the router, which maps out a route to the dNIB. The route may require more than one intermediate stop. The NIB, at each intermediate node, maintains a cdr record of the call and sends it to the next NIB unit it reaches the dNIB.

At step 8090, the Network Interface of the dNIB receives the call. In one embodiment, the callrecv procedure preforms this task. Callrecv accepts the call and stores it in the Call Files Database. At step 8100, the TCP connection between oNIB and dNIB is released.

At step 8110, the Call Server strips the TCP/IP header from each packet, restoring the call with the DDCMP format. At step 8120, the Call Server queues the VMS Interface, which delivers the call to the VMS. In one embodiment, the VMS Interface's centtx procedure delivers the call to the VMS. At step 8130, the VMS interface establishes connection with the dVMS and commences delivery. At step 8140, the dVMS stores the call in the appropriate mailbox.

Figure 9:
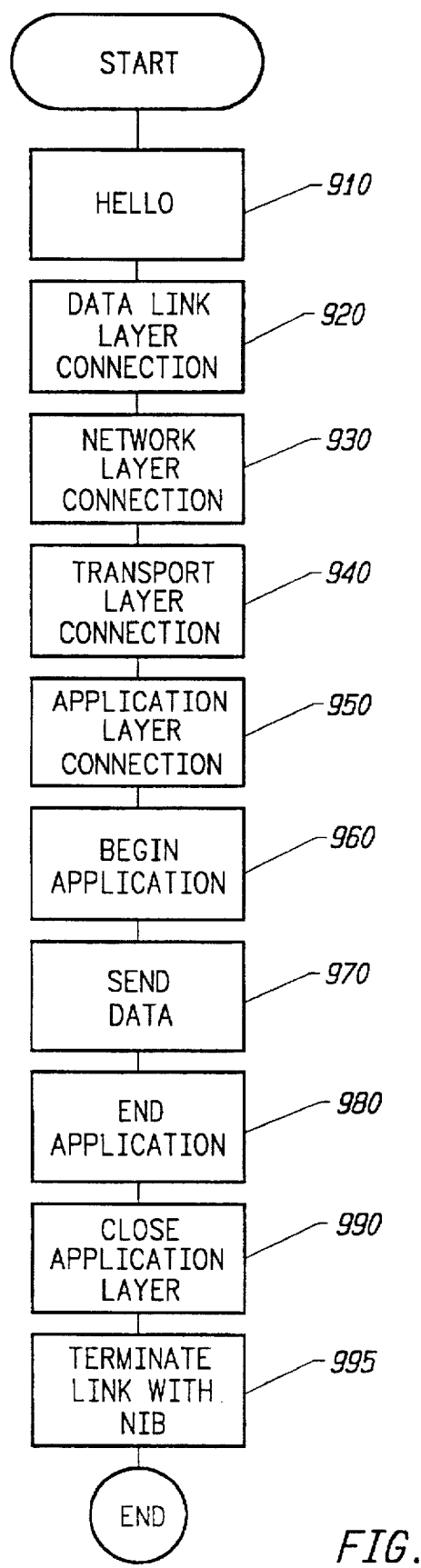
FIG. 9 is a flow chart illustrating the procedure for forwarding a message by an originating VMS to the NIB.

FIG. 9 illustrates the sequence of steps for transferring a call from the VMS to the NIB (step 8020 in FIG. 8), according to one embodiment of the present invention. At step 910, the VMS starts the communication process by sending a hello message to the VMS Interface. After a pause of about $1/10^{th}$ of a second, the VMS initiates connection with the NIB's Data Link Layer at step 920. In one embodiment, the Data Link Layer connection may be formed by the following exchange of messages between the VMS and the VMS Interface. First, the VMS sends a DDCMP_STRT message, which causes the VMS Interface to also send its own DDCMP_STRT message. The DDCMP_STRT messages are used to perform synchronization on the data link. When the data link is synchronized, the VMS responds with a DDCMP_STACK message, indicating that initialization of the data link is completed. Finally, the NIB acknowledges by sending a DDCMP_ACK message to the VMS, thus completing connection at the Data Link Layer.

At step 930, the VMS starts the connection at the Network Layer. To begin this process, the VMS sends, for example, an OPEN_NETWORK_LAYER command. The VMS Interface then completes the Network layer connection by responding with the OPEN_NETWORK_LAYER message. At step 940, the VMS forms a connection at the Transport Layer by issuing a NC_CRE_REQ (network connection creation request) request. In response, the VMS Interface sends a NC_CRE_REP (network connection creation reply) message, indicating that the network connection has been created.

At step 950, the VMS opens the Application Layer. In one embodiment, the Application Layer may be opened by having the VMS transmit an APPL_BEGIN message. This will be followed with an APPL_ACK message issued by the VMS Interface. Once the Application Layer connection is established, the VMS issues an APPL_REQ_BEGIN message to begin the application (i.e., sending the call) at step 960. The VMS Interface, upon receiving the APPL_REQ_BEGIN message, sends a T_CALL_REQUEST to the NIB's Call Server. The Call Server generates a CDR record for the call and sends a T_CALL_STATUS message to the VMS Interface. The callid, which identifies the name of the file in which the call is to be stored, is included in the T_CALL_STATUS message.

At step 970, the VMS sends the call to the VMS Interface which stores it in the Call File database. When the VMS finishes transmitting the call, it ends the application by sending an APPL_REQ_END message at step 980. When the VMS Interface receives the APPL_REQ_END message, it sends the T_DISTRIBUTION_LIST (containing the list of destination mailboxes), L_ORIGIN (containing the mailbox from which the call originated), and T_OUTGOING_CALL (indicating an outgoing call) parameters to the Call Server. Thereafter, the VMS Interface issues an acknowledgment (APPL_ACK) to the VMS. At step 990, the VMS ends the application and sends an APPL_END message to VMS Interface which causes the VMS Interface to responds with an APPL_ACK message. Finally, the VMS terminates the link with the NIB by issuing MSG_BLK_END and CLOSE_NETWORK_LAYER messages at step 995.

Figure 10:
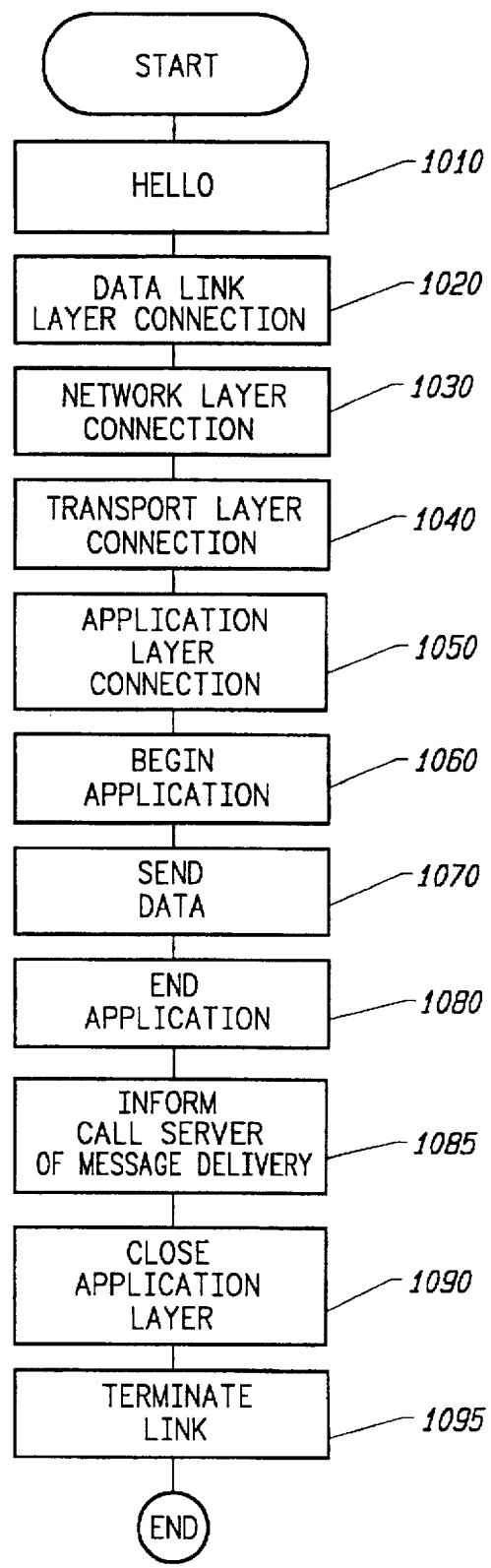
FIG. 10 is a flow chart illustrating the procedure for forwarding a message by a destination NIB to the VMS.

FIG. 10 illustrates the sequence of steps for transferring a call from the NIB to the VMS (step 8140 in FIG. 8) according to one embodiment of the present invention. At step 1010, the NIB's VMS Interface starts the communication process by sending a hello message to the VMS. At step 1020, the VMS pauses for about $1/10^{th}$ of a second before connecting to VMS's Data Link Layer. Similar to FIG. 8, the Data Link Layer connection may be formed by the following exchange of messages between the NIB and the VMS. The VMS Interface sends a DDCMP_STRT message, which in turns causes the VMS to respond with a DDCMP_STRT message. The VMS Interface then issues a DDCMP_STACK message, indicating that initialization of the data link is completed. Upon receiving the DDCMP_STACK message, the VMS acknowledges by sending a DDCMP_ACK message to the VMS Interface, thus completing connection at the Data Link Layer.

At step 1030, the VMS Interface starts the Network Layer connection. To begin this process, the VMS Interface sends, for example, an OPEN_NETWORK_LAYER command. The VMS Interface then completes the Network layer connection by responding with the OPEN_NETWORK_LAYER message. At step 1040, the VMS Interface forms a connection with the VMS's Transport Layer by issuing a NC_CRE_REQ (network connection creation request) request. In response, the VMS sends a NC_CRE_REP (network connection creation reply) message, indicating that the network connection has been created.

At step 1050, the VMS Interface opens the Application Layer. In one embodiment, the Application Layer may be opened by having the VMS Interface transmit an APPL_BEGIN message. Connection to Application Layer is established when the VMS responds with an APPL_ACK message. At step 1060, the VMS Interface issues an APPL_REQ_BEGIN message to begin the application (i.e., sending the call to the VMS). At step 1070, the VMS Interface, upon receiving an APPL_ACK message from the VMS, transmits the call to the VMS. Once the call has been sent to the VMS, the VMS Interface issues an APPL_REQ_END to end the application at step 1080. The VMS then acknowledges by sending an APPL_ACK message.

At step 1085, the VMS Interface sends I_ACCEPTED to the Call Server, indicating that the VMS has accepted the call. In addition, the VMS interface sends T_DISTRIBUTION_LIST (containing list of destinations to which the call is to be sent) and L_DESTINATION (containing the address of the destination mailbox) to the Call Server. The Call Server then responds with a T_NO_MORE_CALLS, instructing the VMS Interface to terminate communication with the VMS. At step 1090, the VMS Interface issues an APPL_END message to end the Application Layer connection. Next, the VMS issues a acknowledgment (APPL_ACK) to the VMS Interface. At step 1095, the VMS Interface terminates the link with the VMS by issuing MSG_BLD_END and CLOSE_NETWORK_LAYER messages. Finally, the VMS Interface resets itself and informs the Call Server that it is ready to accept more calls (i.e., C_READY_FOR_CALLS message).

b. Message Translation

Figure 11:
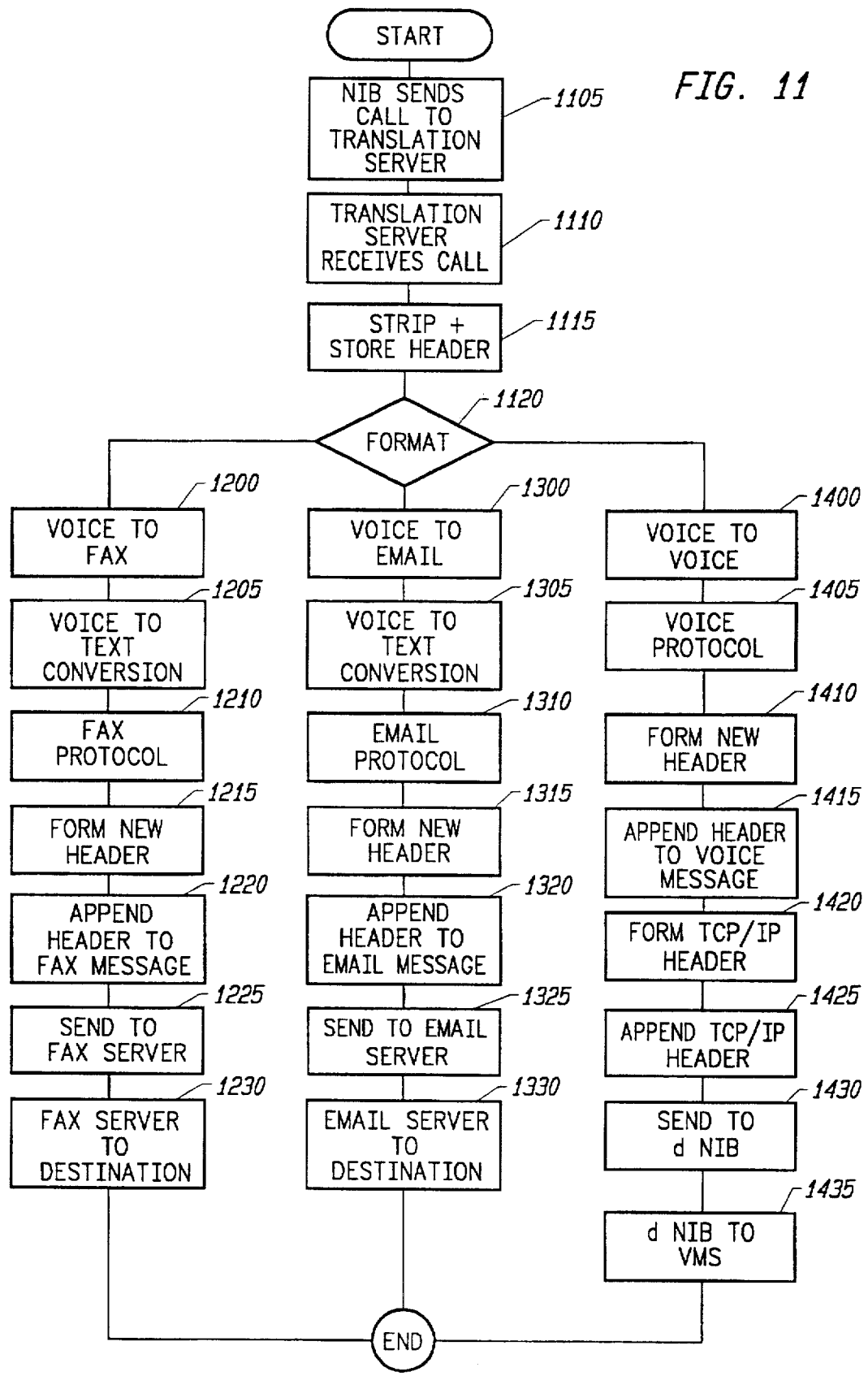
FIG. 11 is a flow chart illustrating the procedure for message translation.

FIG. 11 illustrates the procedure for translating a message from one medium to another. At step 1105, a NIB sends a voice message, which requires translation to another medium or format, to the Translation server at Network Management Site. At step 1110, the Translation server receives the message. At step 1115, the header is stripped off the message and then stored in a file. The Translation Server then assesses the format requested by the caller at step 1120.

The system goes to step 1200 if the caller requests the voice message to be converted to a facsimile message. At step 1205, the voice message unit (without the header) is processed through the voice-to-text conversion software. Upon completion, the Translation server accesses a database, similar to the Network database, that provides the necessary protocol translation information at step 1210. At step 1215, the Translation server determines the correct protocol and creates an appropriate header. At step 1220, the header is appended to the facsimile message. At step 1225, the Translation server transmits the message to the appropriate FAX server at the destination network address. The FAX server then forwards the message to its destination at 1230.

The system goes to step 1300 if the caller requests the voice message to be converted to an email message. At step 1305, the voice message unit (without the header) is processed through the voice-to-text conversion software. Upon completion, the translation server accesses a database containing protocol translation information at step 1310. At step 1315, the Translation server determines the correct protocol and creates an appropriate header. At step 1320, the header is appended to the facsimile message and transmitted to the appropriate Email server at the destination network address. At step 1325, the forwarded to its destination by the Email server. At step 1330, the email server delivers the message to the recipient.

The system goes to step 1400 if the caller requests the voice message to be converted to another voice format. At step 1405, the translation server accesses a database containing protocol translation information used by the other VMSs. At step 1410, by comparing the message's destination address with the database, the Translation server determines the correct protocol format and creates the an appropriate voice mail header. At step 1415, the voice mail header is appended to the voice message. At step 1420, a TCP/IP header is created similar to the steps 8050–8060 in FIG. 8a. At step 1425, the Translation server encapsulates the message with the TCP/IP header and sends it to the appropriate dNIB at step 1430. At step 1435, the dNIB transfer the voice message to the VMS.

The procedure for translating, for example, a text-to-voice message may be somewhat analogous to the steps described in FIG. 11 (i.e., using information stored in the databases to define the protocol and header format). However, the message will be processed through the appropriate text-to-voice software, if applicable. In this manner, messages can be transmitted in different media formats.

c. Archiving and Deleting Call Files and CDR Records

Figure 12A:
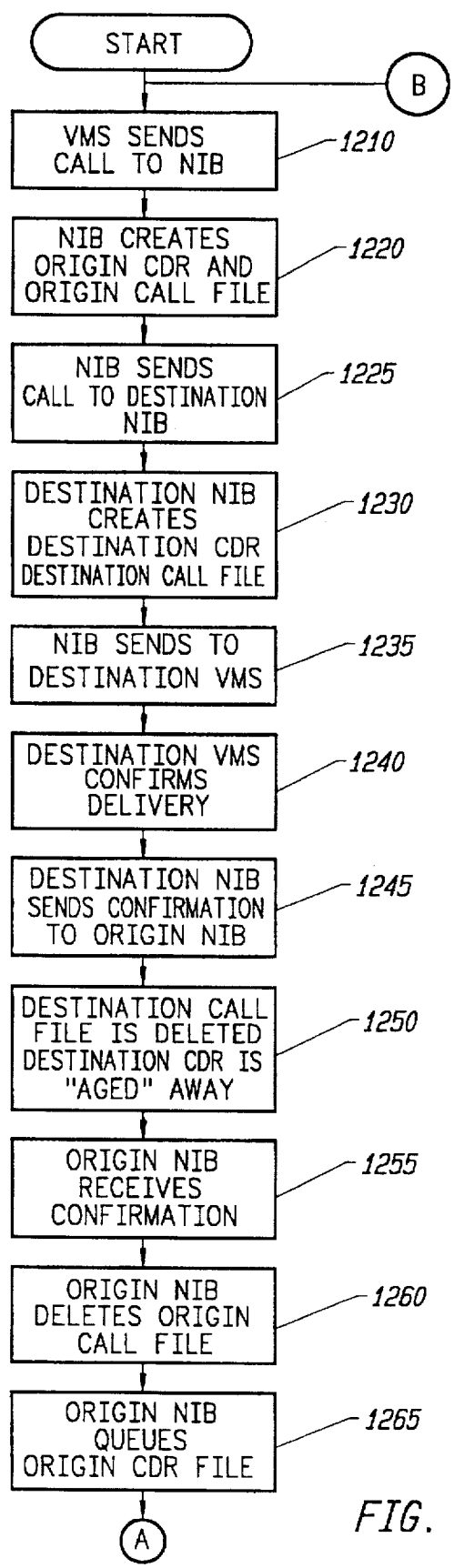
FIGS. 12a–12b are flow charts illustrating the archiving procedure according to the present invention.
Figure 12B:
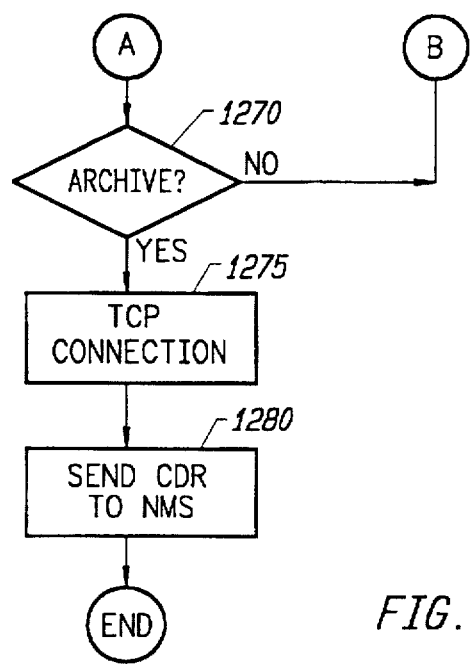

The forwarding of a call from an oVMS to a dVMS creates a call file and a CDR record on both the originating and destination NIBs. These files are retained on the NIBs until they are archived or deleted. FIG. 12 illustrates the process of creating, archiving, and deleting the files, as implemented according to one embodiment of the present invention. At step 1210, the oNIB receives from the VMS a call that is to be transmitted over the WAN to the destination mailbox. At step 1220, the oNIB creates CDR record and call file, which are referred to as "origin CDR record" and "origin call file," respectively. These files are stored in the appropriate NIB databases.

At step 1225, after processing the call, it is routed over the WAN to its destination. At step 1230, the dNIB, upon receiving the call, creates a CDR and call file which are referred to as "destination CDR record" and "destination call file." The destination CDR record is a working copy of the CDR data, used by the dNIB during call processing. The destination call file is an exact copy of the origin call file.

After processing the call, the NIB delivers it to the destination mailbox in the dVMS at step 1235. At step 1240, the VMS confirms delivery of the call. At step 1245, the dNIB responds by delivering a confirmation notice to the oNIB. At step 1250, dNIB deletes the destination call file. In some embodiments, the dNIB retains the CDR record until it is "aged" away. In other words, the NIB transfers the CDR record to a delete queue. When the queue exceeds its limit, for example, by more than 10%, the server automatically deletes the oldest records in the queue to bring the queue size down to the limit. In this way, the queue always contains the most recent records. The queue limit is determined by the "delete queue limit" configuration parameter. In one embodiment, this parameter is set to approximate the number of calls processed by the NIB in 24 hours. This will insure that the NIB database reflects the most recent 24 hours of call activity.

At step 1255, the oNIB receives the delivery confirmation sent by the dNIB. At step 1260, the oNIB deletes the origin call file. At step 1265, the oNIB queues the origin CDR record for archiving in the network wide master archive database on the NMS. This master CDR database contains one CDR record for each call completed network wide.

Two server configuration parameters govern when the NIB will initiate archiving. "Archive Timeout" and "Archive Queue Limit." Archive Timeout determines the period in which the Timer module informs the NIB to archive the CDR files. In some embodiments, the time period is measured in minutes and, depending on NIB loading, is set at about 10 to 30 minutes. Archive Queue Limit parameter sets the threshold on the number of calls in the archive queue. When the queue depth reaches this number of calls, the server initiates archiving. According to one embodiment, this value is set to a relatively small number, such as 20 to minimize the duration of archive connections.

At step 1270, the oNIB determines whether or not to initiate archiving, based on the archiving parameters. If the archiving parameters have not been satisfied, the process loops back to step 1210. On the other hand, if archiving parameters have been satisfied, the oNIB, at step 1275, initiates archiving by setting up a TCP connection to the archive process on the NMS. The NIB utilizes the archsend task in the NIB's Network Interface to accomplish this. At step 1280, after the TCP connection is set up, all of the CDR records in the archive queue are transferred. In some embodiments, archiving is implemented by a background process running on the Catcher server located on the Network Management site, requiring no operator interaction. The process opens the Archive database and stores the CDR records therein.

d. Updating Network Database

Figure 13:
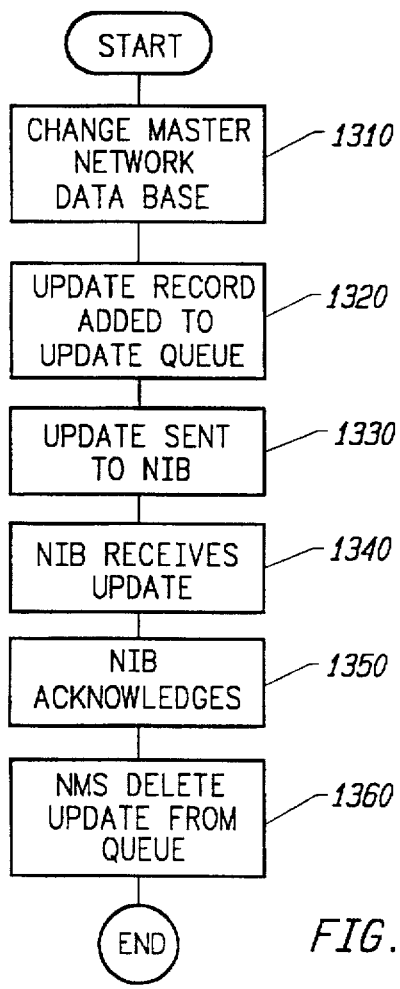
FIG. 13 is a flow chart illustrating the procedure for updating a network database by the Network Manager.

FIG. 13 illustrates the steps in for updating the Network database. At step 1310, the network operator interactively enters the changes to the NIB or VMS node definitions into the master network database, which resides on the NMS. At step 1320, an individual update record is added to the network update queue in the master network database for each defined NIB. Each update record contains the changes entered by the operator at step 1310.

At step 1330, the NMS forwards each individual update over the network to its corresponding NIB. The updates are sent over the network using UDP datagrams. At step 1340, the Network Interface (netrecv) in the dNIB accepts the UDP datagrams. At step 1350, the dNIB acknowledges acceptance of the datagrams to the NMS. At step 1360, the NMS deletes the record for that specific update from the update queue.

According to one embodiment, the NMS continues to deliver a specific update record until it receives an acknowledgement from the dNIB. In this manner, a dNIB, which is not on line when the update is created, will still receive the update when it is brought back on line, no matter what amount of time has elapsed.

The above description is illustrative and not restrictive. Many variations of the invention will become apparent to those of skill in the art upon review of this disclosure. Merely by way of example other protocols may be employed in the communications network. The scope of the invention should, therefore, be determined not with reference to the above description, but instead should be determined with reference to the appended claims along with their full scope of equivalents.

What is claimed is:

1. A communication system, comprising:
   a communications network for transmitting data formatted according to a first protocol suite;
   a plurality of voice messaging systems interconnected by said communications network, each voice messaging system comprising,
   a first voice messaging processor coupled to a telephone network for receiving a first voice message from a subscriber of said telephone network and generating a representation of said first voice message according to a second protocol; and
   a first interface for coupling said first voice messaging processor to said communications network, said first interface for receiving said representation of said first voice message from said first voice messaging processor and converting said representation of said first voice message to a converted representation of said first voice message according to said first protocol suite for transmission over said communications network to another of said voice messaging systems; and
   a management site coupled to said communications network, said management site comprising
   an identifier server for receiving an undeliverable voice message and determining a reason said undeliverable voice message could not be delivered.

2. The communication system of claim 1 wherein said second protocol is a Digital Data Communication Message Protocol (DDCMP) and said first protocol suite is a Transmission Control Protocol/Internet Protocol (TCP/IP) suite.

3. The communication system of claim 1 wherein said communications network comprises a wide area network.

4. The communication system of claim 3 wherein said wide area network comprises an Asynchronous Transfer Mode network.

5. The communication system of claim 1 further comprising a router connected to said communications network and said first interface, said router being for determining a path within said communications network through which said converted representation of said first voice message is transmitted to said another of said voice messaging systems.

6. The communication system of claim 5 wherein said router and said first interface are connected via a local area network.

7. The communication system of claim 6 wherein said local area network comprises an Ethernet.

8. The communication system of claim 1 further comprising:
   a second voice messaging processor associated with said another of the voice messaging systems for storing a reconverted representation of said first voice message in said first protocol; and
   a second interface for coupling said second voice messaging processor to said communications network, wherein said second interface receives said converted representation of said first voice message from said communications network, reconverts it to said reconverted representation of said first voice message, and transmits it to said second voice messaging processor.

9. The communication system of claim 1 wherein each voice messaging processor comprises a programmable digital computer.

10. The communication system of claim 1 wherein said management site further comprises:
    a router for connecting said management site to said communications network;
    a network manager providing management functions for said communications network;
    a catcher server for receiving a first call detail report record from said first interface, said first call detail report record containing information corresponding to said first voice message, said catcher server storing said first call detail report record in a database, said database comprising a plurality of call detail report records; and
    a programmable digital computer, said computer accessing said database so as to generate billing reports.

11. The communication system of claim 10 wherein said management site further comprises:
    a translation server for translating said representation of said first voice message to a different medium; and
    a video conference server for providing video conferencing to said communications network.

12. A method for providing voice messaging services using a plurality of voice messaging systems interconnected via a communications network, each voice messaging system comprising a voice messaging processor and an interface, the method comprising the steps of:
    in a first voice messaging system, generating a representation of a first voice message in a first voice messaging processor coupled to a telephone network, said first voice message being received from a subscriber of said telephone network, said representation of said first voice message being formatted according to a first protocol;
    transmitting said representation of said first voice message via a local area network to a first interface, said first interface for converting said first protocol to a second protocol suite for transmission of a converted representation of said first voice message over said communications network from said first voice messaging system to a second voice messaging system, the second voice messaging system comprising a second interface and a second voice messaging processor;

receiving said converted representation of said first voice message at said second interface, said second interface reconverting said second protocol suite to said first protocol for processing by said second voice messaging processor; and providing a management site coupled to the communications network for receiving an undeliverable voice message and determining a reason said undeliverable voice message could not be delivered.

13. The method as recited in claim 12 wherein said transmitting step comprises the steps of:

establishing connection between said first voice messaging processor and said first interface;

sending said representation of said first voice message to said first interface after connection has been established;

processing said representation of said first voice message to determine a network address associated with said second voice messaging system;

converting said first protocol to said second protocol suite;

initiating connection between said first interface and said second interface; and transmitting said converted representation of said first voice message from said first interface to said second interface.

14. The method as recited in claim 12 wherein said receiving step comprises the steps of:

reconverting said converted representation of said first voice message from said second protocol suite to said first protocol thereby generating a reconverted representation of said first voice message;

establishing connection with said second voice messaging processor; and delivering said reconverted representation of said first voice message to said second voice messaging processor.

15. The method as recited in claim 14 further comprising the step of determining a path by which said converted representation of said first voice message is transmitted over said communications network to said second voice messaging system.

16. The method as recited in claim 14 further comprising the steps of:

generating a first call detail report corresponding to said first voice message;

storing said first call detail report in a temporary database containing a plurality of call detail reports; and transferring said plurality of call detail reports to a permanent database residing at said management site after said plurality of call detail reports have reached a predetermined number or a predetermined time has elapsed.

17. The method as recited in claim 12 wherein said first protocol is a variant of Digital Data Communication Message Protocol (DDCMP) protocol and said second protocol suite is a Transmission Control Protocol/Internet Protocol (TCP/IP) suite.

18. The method as recited in claim 12 further comprising the steps of:

sending a receipt acknowledgment from said second interface to said first interface indicating a successful message delivery when said converted representation of said first voice message successfully reaches said second interface; and sending a message failure indication from said second interface to said first interface indicating an unsuccessful message delivery when said converted representation of said first voice message fails to reach said second interface.

19. The method as recited in claim 18 further comprising the steps of:

generating a failure record when said converted representation of said first voice message fails to reach said second voice messaging processor; and storing said failure record in a failure record database.

20. The method as recited in claim 12 further comprising the steps of:

translating said representation of said first voice message to a message formatted in a different medium; and transmitting said message to another one of the voice messaging systems.

21. A communication system, comprising:

a communications network for transmitting data formatted according to a first protocol suite;

a plurality of voice messaging systems interconnected by said communications network, each voice messaging system comprising, a voice messaging processor coupled to a telephone network for receiving a first voice message from a subscriber of said telephone network and generating a representation of said first voice message according to a second protocol; and an interface for coupling said voice messaging processor to said communications network, said interface for receiving said representation of said first voice message from said voice messaging processor and converting said representation of said first voice message to said first protocol suite for transmission over said communications network to another of the voice messaging systems; and a management site coupled to said communications network, said management site comprising:

a router for connecting said management site to said communications network;

a network manager providing management functions for said communications network;

a catcher server for receiving a call detail report record from said first interface, said call detail report record containing information regarding said first voice message, said catcher server storing said call detail report record containing information regarding said first voice message, said catcher server storing said call detail report record in a database, said database comprising a plurality of call detail report records;

a programmable digital computer, said computer accessing said database so as to generate billing reports; and an identifier server for receiving an undeliverable voice message and determining a reason said undeliverable voice message could not be delivered.

22. A communication system, comprising:

a communications network for transmitting data formatted according to a first protocol suite;

a plurality of voice messaging systems interconnected by said communications network, each voice messaging system comprising, a voice messaging processor coupled to a telephone network for receiving a first voice message from a subscriber of said telephone network and generating a representation of said first voice message according to a second protocol; and an interface for coupling said voice messaging processor to said communications network, said interface for receiving said representation of said first voice message from said voice messaging processor and converting said representation of said first voice message to said first protocol suite for transmission over said communications network to another of the voice messaging systems; and a management site coupled to said communications network, said management site comprising:

a router for connecting said management site to said communications network;

a network manager providing management functions for said communications network;

a catcher server for receiving a call detail report record from said first interface, said call detail report record containing information regarding said first voice message, said catcher server storing said call detail report record containing information regarding said first voice message, said catcher server storing said call detail report record in a database, said database comprising a plurality of call detail report records;

a programmable digital computer, said computer accessing said database so as to generate billing reports;

an identifier server for receiving an undeliverable voice message and determining a reason said undeliverable voice message could not be delivered;

a translation server for translating said first voice message to a different medium; and a video conference server for providing video conferencing to said communications network.

23. A communication system, comprising:

a communications network for transmitting data formatted according to a first protocol suite;

a plurality of voice messaging systems interconnected by said communications network, each voice messaging system comprising, a voice messaging processor coupled to a telephone network for receiving a first voice message from a subscriber of said telephone network and generating a representation of said first voice message according to a second protocol; and an interface for coupling said voice messaging processor to said communications network, said interface for receiving said representation of said first voice message from said voice messaging processor and converting said representation of said first voice message to said first protocol suite for transmission over said communications network to another of the voice messaging systems; and a management site coupled to said communications network, said management site comprising:

a network manager providing management functions for said communications network;

a router for connecting said management site to said communications network; and an identifier server for receiving an undeliverable voice message and determining a reason said undeliverable voice message could not be delivered.

24. A communication system, comprising:

a communications network for transmitting data formatted according to a first protocol suite;

a plurality of voice messaging systems interconnected by said communications network, each voice messaging system comprising, a voice messaging processor coupled to a telephone network for receiving a first voice message from a subscriber of said telephone network and generating a representation of said first voice message; and an interface for coupling said voice messaging processor to said communications network, said interface for receiving said representation of said first voice message from said voice messaging processor and converting said representation of said first voice message for transmission over said communications network to another of the voice messaging systems; and a management site coupled to the communications network, said management site including an identifier server for receiving an undeliverable voice message and determining a reason said Undeliverable voice message could not be delivered.

25. A method for providing voice messaging services using a plurality of voice messaging systems interconnected via a communications network, each voice messaging system comprising a voice messaging processor and an interface, the method comprising the steps of:

generating a representation of a first voice message in a first voice messaging processor coupled to a telephone network, said first voice message being received from a subscriber of said telephone network;

transmitting said representation of said first voice message via a network to a first interface associated with said first voice messaging processor, said first interface for converting said representation of said first voice message to a converted representation of said first voice message for transmission over said communications network to a second voice messaging system, the second voice messaging system comprising a second interface and a second voice messaging processor;

receiving said converted representation of said first voice message at said second interface, said second interface reconverting said converted representation of said first voice message for processing by said second voice messaging processor; and providing a management site coupled to the communications network for receiving an undeliverable voice message and determining a reason said undeliverable voice message could not be delivered.

* * * * *